No. 697,506. Patented Apr. 15, 1902.
R. C. MacCULLOCH.
STOVE FOR HEATING, COOKING, AND BAKING.
(Application filed Dec. 16, 1901.)
(No Model.)
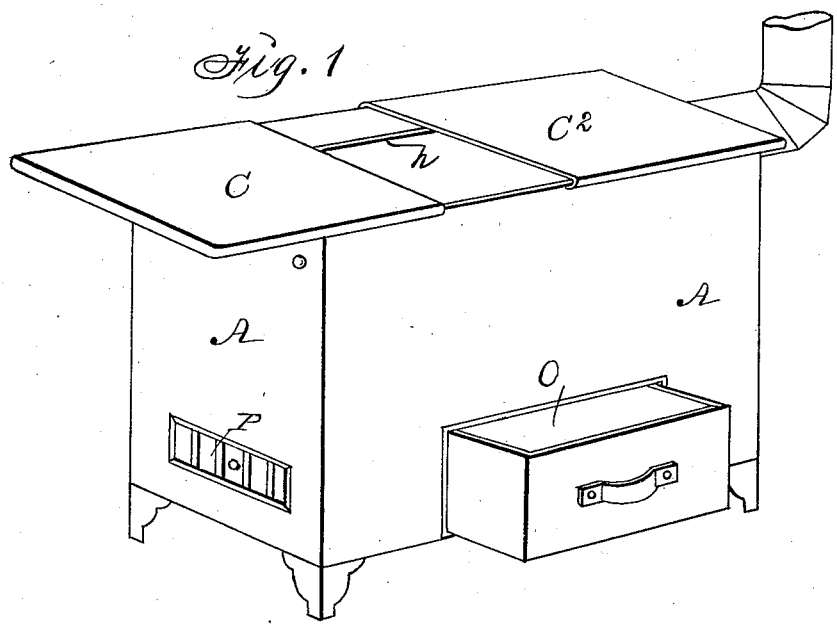
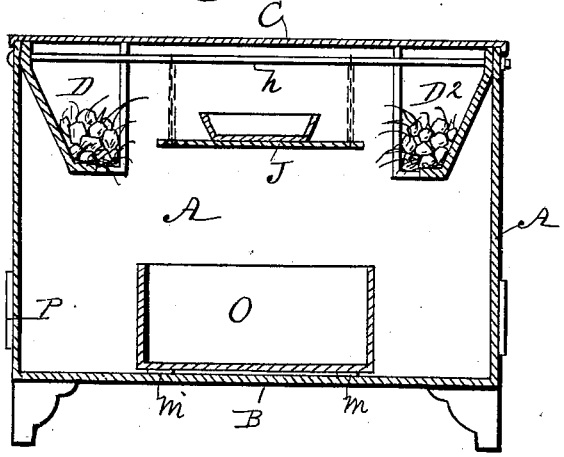
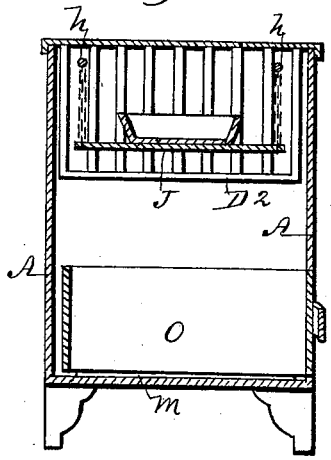
Witnesses:
L. H. Orwig.
D. E. Holladay.
Inventor: Robert C. MacCulloch,
By Thomas C. Orwig, Attorney.

UNITED STATES PATENT OFFICE.

ROBERT CUMMING MacCULLOCH, OF DES MOINES, IOWA.

STOVE FOR HEATING, COOKING, AND BAKING.

SPECIFICATION forming part of Letters Patent No. 697,506, dated April 15, 1902.

Application filed December 16, 1901. Serial No. 86,024. (No model.)

*To all whom it may concern:*

Be it known that I, ROBERT CUMMING MAC-CULLOCH, a citizen of the United States, residing at Des Moines, in the county of Polk and State of Iowa, have invented a new and useful Stove for Heating, Cooking, and Baking, of which the following is a specification.

My object is to provide a simple, light, durable, and portable metal stove specially adapted for utilizing charcoal for heating, cooking, and baking.

My invention consists in the construction, arrangement, and combination, with the wall of a stove, of sliding covers, elevated baskets, a removable oven, registers, and means for suspending food between fire in the fuel-baskets, as hereinafter set forth, pointed out in my claims, and illustrated in the accompanying drawings, in which—

Figure 1 is a perspective view of the stove, showing one of the sliding covers extended as required in opening the top of the stove and the oven partly drawn out as required for getting access thereto. Fig. 2 is a longitudinal sectional view showing the relative positions of all the parts, and Fig. 3 is a central transverse sectional view.

The letter A designates the four-sided wall, and B the bottom, of the stove, preferably made of galvanized sheet metal. It may vary in size as desired.

C and C² are sliding covers fitted on the top of the wall and provided with flanges, as shown, or in any suitable way, as required to prevent lateral movement while sliding the covers and to retain them in place when in position to close the top of the stove.

D and D² are baskets fixed in the ends of the top of the wall. The backs of the baskets are made of sheet metal and fastened to the ends of the wall A at their tops and extend downward in inclined position and away from the wall, so as to allow air to circulate around the baskets. The fronts and bottoms of the baskets are in the form of grates, adapted for retaining charcoal or other suitable fuel suspended in the end portions of the stove.

Rods $h$ are extended through the top of the stove and fixed in the ends of the wall and also to serve as a means for suspending food in vessels or otherwise between the fires in the baskets as required for subjecting meat and vegetables to the heat and cooking the food.

J represents a flat plate suspended from the rods $h$ and a pan on top of the plate.

An oven O in the form of a drawer is fitted in the lower and central portions of the stove and supported upon fixed bearings $m$, as required to allow heated air to circulate under and around the oven and for sliding the oven in and out thereon.

Registers P are fixed in the ends of the wall A near the bottom for regulating the admission of air, and R is a flue at the top of one end of the wall, provided with a damper (not shown) for regulating the draft of air through the stove.

Having thus described the purpose, construction, and operation of my invention, its practical utility will be readily understood by persons familiar with the art to which it pertains, and

What I claim as new, and desire to secure by Letters Patent, is—

1. In a stove having an open top, covers fitted thereon to slide in opening and closing the top and baskets for supporting fuel under the covers at the ends and top of the stove, arranged and combined as set forth for the purposes stated.

2. In a stove having an open top, covers fitted thereon to slide in opening and closing the top and baskets for supporting fuel under the covers at the ends and top of the stove and an oven in the form of a sliding drawer in the bottom and central portion of the stove, arranged and combined as set forth for the purposes stated.

3. A stove for heating, cooking and baking comprising a four-sided wall, sliding covers on top of the wall, rods extended through the top portion of the stove and fixed to the ends of the wall, baskets for fuel fixed in the top and end portions of the stove, an oven in the lower and central portion of the stove, registers in the lower portions of the ends of the wall and a flue at the top of one end of the wall, arranged and combined to operate in the manner set forth for the purposes stated.

ROBERT CUMMING MacCULLOCH.

Witnesses:
 MATT H. WILKINSON,
 L. A. TUSSING.